US 11,383,846 B2

(12) United States Patent
Arvanitis (10) Patent No.: US 11,383,846 B2
(45) Date of Patent: Jul. 12, 2022

(54) AIRCRAFT WING ICE PROTECTION SYSTEM AND METHOD

(71) Applicant: BOMBARDIER INC., Dorval (CA)

(72) Inventor: Steve Arvanitis, Dollard-des-Ormeaux (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 16/832,365

(22) Filed: Mar. 27, 2020

(65) Prior Publication Data

US 2021/0276721 A1     Sep. 9, 2021

Related U.S. Application Data

(60) Provisional application No. 62/825,067, filed on Mar. 28, 2019.

(51) Int. Cl.
*B64D 15/04*     (2006.01)
*B64C 3/14*      (2006.01)

(52) U.S. Cl.
CPC ............ *B64D 15/04* (2013.01); *B64C 3/14* (2013.01); *B64C 2003/143* (2013.01)

(58) Field of Classification Search
CPC .... B64D 15/04; B64D 15/02; B64C 2003/143
See application file for complete search history.

(56) References Cited

U.S. PATENT DOCUMENTS

| 5,011,098 A | 4/1991 | McLaren et al. | |
|---|---|---|---|
| 5,114,100 A * | 5/1992 | Rudolph | B64C 21/06 244/134 C |
| 8,403,632 B2 * | 3/2013 | Surace | F01D 25/08 415/116 |
| 8,864,078 B2 * | 10/2014 | Barbara | B64D 15/16 244/134 B |

(Continued)

FOREIGN PATENT DOCUMENTS

| EP | 0436243 | 7/1991 |
|---|---|---|
| EP | 2214961 | 8/2010 |

(Continued)

OTHER PUBLICATIONS

Cuhna, "Heat Transfer Analysis", Pratt & Whitney, United Technologies Corporation.

(Continued)

*Primary Examiner* — Brian M O'Hara
(74) *Attorney, Agent, or Firm* — Norton Rose Fulbright Canada (57) ABSTRACT

An aircraft wing has a wing body with a span and a chord. A skin of the wing body has a leading edge portion with an inner surface delimiting a cavity of the wing body. A wing ice protection system includes a curved flow guide disposed within the cavity and spaced apart from the leading edge portion to define a fluid channel, A bleed air supply is operable to convey bleed air to the fluid channel. Turbulence-generating members are positioned within the leading edge portion to engage the bleed air in the fluid channel. The (Continued)

members are spaced apart along the fluid channel in a chordwise direction and/or in a spanwise direction. A thermal barrier may be disposed on the curved flow guide to thermally insulate the leading edge interior from the fluid channel.

26 Claims, 3 Drawing Sheets

(56) References Cited

U.S. PATENT DOCUMENTS

| | | | | |
|---|---|---|---|---|
| 9,488,067 | B2* | 11/2016 | Johnson | F01D 25/02 |
| 10,458,275 | B2* | 10/2019 | Chilukuri | B64D 15/02 |
| 2009/0108134 | A1* | 4/2009 | Thodiyil | C23C 4/131 |
| | | | | 244/134 B |
| 2011/0138578 | A1* | 6/2011 | Premazzi | B64D 29/00 |
| | | | | 16/385 |
| 2012/0318922 | A1* | 12/2012 | Saito | B64C 3/28 |
| | | | | 244/134 B |
| 2017/0314412 | A1* | 11/2017 | Tiwari | B64D 15/04 |

FOREIGN PATENT DOCUMENTS

| | | |
|---|---|---|
| EP | 2546147 | 1/2013 |
| FR | 672807 | 1/1930 |

OTHER PUBLICATIONS

Glezer et al, "A Novel Technique for the Internal Blade Cooling", Presented at the International Gas Turbine and Aeroengine Congress & Exhibition, Birmingham, UK, Jun. 10-13, 1996.

Bunker, "Innovative Gas Turbine Cooling Techniques", WIT Transactions on State of the Art in Science and Engineering, vol. 42, © 2008 WIT Press, www.witpress.com, ISSN 1755-8336 (on-line).

Immarigeon et al., "An Advanced Impingement/Film-Cooling Scheme for Gas Turbines—Numerical Study", WIT Transactions on Modelling and Simulation, vol. 41, © 2005 WIT Press, www.witpress.com, ISSN 1743-355X (on-line).

Murata et al., "Heat Transfer Enhancement due to Combination of Dimples, Protrusions, and Ribs in Narrow Internal Passage of Gas Turbine Blade", Paper No. GT2011-45356, pp. 1173-1182; 10 pages, https://doi.org/10.1115/GT2011-45356.

* cited by examiner

AIRCRAFT WING ICE PROTECTION SYSTEM AND METHOD

CROSS-REFERENCE TO RELATED APPLICATIONS

This application claims priority to U.S. provisional patent application 62/825,067 filed Mar. 28, 2019, the entire contents of which are incorporated by reference herein.

TECHNICAL FIELD

The application relates generally to aircraft wings and, more particularly, to ice protection systems for aircraft wings.

BACKGROUND

Some wing ice protection systems are driven by warm air bled directly off the engine of the aircraft. In some instances, a significant amount of the air bled off the engine, e.g. two thirds, is required for use with the wing ice protection systems. This can result in an increase in the fuel consumption of the engine because the air bled off the engine is lost from the combustion process. This can lead to increased fuel burn in order to achieve the same mechanical power.

SUMMARY

In an aspect, there is provided an aircraft wing, comprising: a wing body having a wing root spaced apart from a wing tip to define a span of the wing, and a leading edge spaced apart from a trailing edge to define a chord of the wing, a skin of the wing body having a leading edge portion with an inner surface delimiting a cavity of the wing body; a wing ice protection system, comprising: a curved flow guide disposed within the cavity and spaced apart from the leading edge portion to define a fluid channel therebetween, the curved flow guide delimiting a leading edge interior separated from the fluid channel; a bleed air supply operable to convey bleed air to the fluid channel; and turbulence-generating members disposed on the curved flow guide and/or the inner surface of the leading edge portion to engage the bleed air in the fluid channel.

In an aspect, there is provided an aircraft wing, comprising: a wing body having a wing root spaced apart from a wing tip to define a span of the wing, and a leading edge spaced apart from a trailing edge to define a chord of the wing, a skin of the wing body having a leading edge portion with an inner surface delimiting a cavity of the wing body; a wing ice protection system, comprising: a curved flow guide disposed within the cavity and spaced apart from the leading edge portion to define a fluid channel therebetween; a bleed air supply operable to convey bleed air to the fluid channel; and turbulence-generating members positioned within the leading edge portion to engage the bleed air in the fluid channel, the turbulence-generating members being spaced apart along the fluid channel in a chordwise direction, and/or the turbulence-generating members being spaced apart along the fluid channel in a spanwise direction.

In an aspect, there is provided a method of providing ice protection for a wing of an aircraft, comprising: conveying bleed air to a leading edge portion of the wing to flow along an inner surface of the leading edge portion, including conveying the bleed air through turbulence-generating members being spaced apart within the leading edge portion in a chordwise direction of the wing, and/or being spaced apart within the leading edge portion in a spanwise direction of the wing.

DESCRIPTION OF THE DRAWINGS

Reference is now made to the accompanying figures in which.

DETAILED DESCRIPTION

Figure 1A:
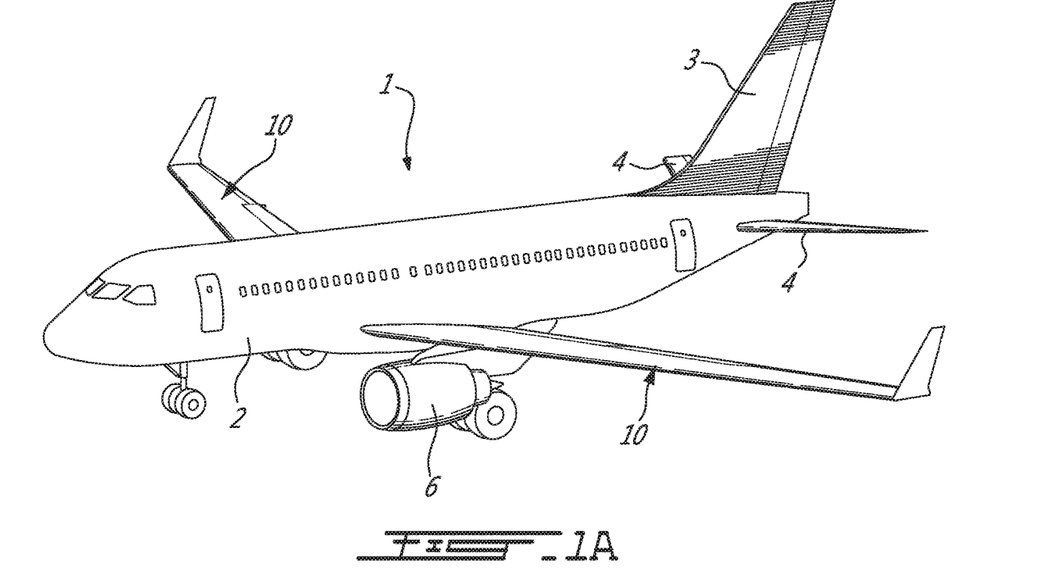
FIG. 1A is a perspective view of an aircraft.

Referring to the drawings and more particularly to FIG. 1A, an aircraft is shown at 1, and is generally described to illustrate some components for reference purposes in the present disclosure. The aircraft 1 has a fuselage 2 having a fore end and an aft end, with a cabin generally located between the cockpit and the tail assembly. A tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 10 project laterally from the fuselage 2. The aircraft 1 has engines 6 supported by the wings 10 in the depicted embodiment, although for other aircraft they can be mounted to the fuselage 2. The aircraft 1 is shown as a jet-engine aircraft, but may also be a propeller aircraft. It is also understood that the aircraft 1 can be a business aircraft, alternately it can be any other type of aircraft, manned or unmanned, including, but not limited to, a commercial aircraft or a military aircraft.

Figure 1B:
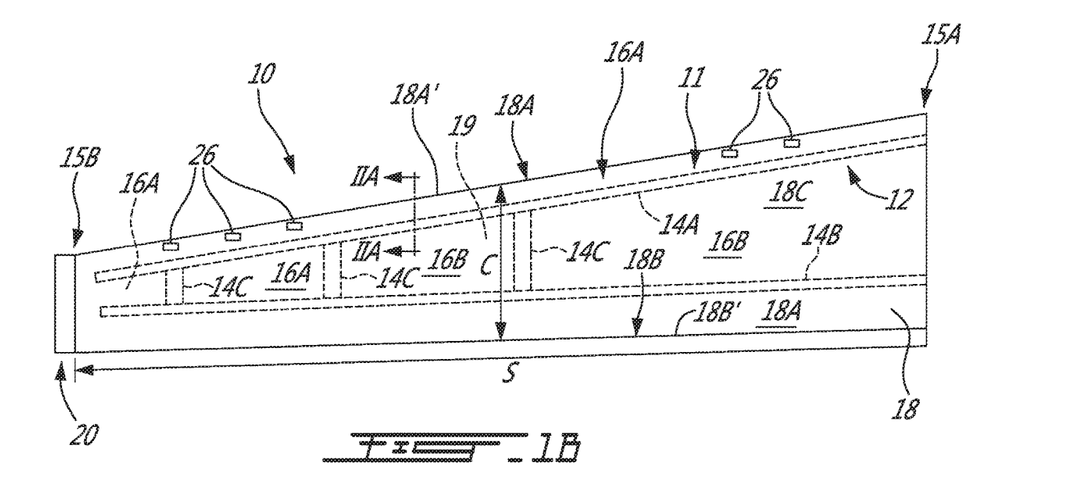
FIG. 1B is a top view of a wing of the aircraft of FIG. 1A.

FIG. 1B shows one of the wings 10 of the aircraft 1. The wing 10 has a wing body 11 which forms the corpus of the wing 10 and provides structure thereto. The wing body 11 makes up the bulk of the wing 10, and is responsible for almost all of the lift produced by the wing 10. The wing body 11 has a span S which forms part of the wing span of the aircraft 1 in the depicted embodiment. The span S is defined between a wing root 15A of the wing body 11 and a wing tip 15B of the wing body 11. The wing root 15A is the portion of the wing 10 closest to the fuselage 2.

Still referring to FIG. 1B, the wing body 11 has an internal frame 12. The internal frame 12 includes any suitable interconnection of components to provide structure to the wing body 11 so that it can support the loads acting on the wing 10 during flight of the aircraft 1. In the depicted embodiment, the internal frame 12 includes any suitable arrangement of spars, ribs, stringers, and other members. As shown in FIG. 1B, the internal frame 12 includes a front or forward spar 14A and a rear or aft spar 14B, which are interconnected by multiple transverse ribs 14C.

The wing body 11 also includes a skin 18 which covers the internal frame 12 and provides an aerodynamic outer surface 18A which in the depicted embodiment, helps the wing 10 to generate lift. A cross-section of the skin 18 taken in a plane transverse to the span S shows the profile of the airfoil defined by the wing body 11 at that location along the span S. A leading edge portion 18A of the skin 18 covers the forward spar 14A, and a trailing edge portion 18B of the skin 18 covers the aft spar 14B. The leading edge portion 18A includes or defines the leading edge 18A' of the wing 10, and the trailing edge portion 18B includes or defines the trailing edge 18B' of the wing 10. The wing 10 has a first or upper skin portion 18C defining an uppermost outer surface of the skin 18 and a second or lower skin portion 18D (see FIG. 2A) defining a lowermost outer surface of the skin 18. The upper and lower skin portions 18C, 18D meet at the leading and trailing edges 18A',18B' of the wing 10 (see FIG. 2A). The skin 18 is any suitable metal or composite material, and is closed on itself such that it defines an hollow interior 19 of the wing 10 and a housing for the internal frame 12. The wing 10 may include multiple flight control surfaces (e.g. flaps, spoilers, ailerons, etc.).

As shown in FIG. 1B, the wing body 11 "narrows" in a spanwise direction away from the wing root 15A. A chord C of the wing body 11, which is defined between the leading edge 18A' and the trailing edge 18B' at a given spanwise location, decreases in a spanwise direction away from the wing root 15A. Stated differently, the chord C along spanwise positions at the wing tip 15B is less than the chord along spanwise positions at the wing root 15A. The forward and aft spars 14A,14B are spaced apart in a chordwise direction along the span S of the wing body 11.

In FIG. 1B, the hollow interior 19 is divided into dry segments 16A and wet segments 16B. The dry segments 16A are volumes of the hollow interior 19 which include components that contribute to the functioning of the wing 10, such as wiring, linkages, piping, etc. In contrast to the dry segments 16A, the wet segments 16B are volumes of the hollow interior 19 in which fuel accumulates. The wet segments 16B are enclosed volumes which form fuel tanks, and are typically positioned on the wing body 11 closer to the wing root 15A to avoid large moments acting on the wing 10. The dry segment 16A of the hollow interior 19 along the leading edge portion 18A of the wing body 11 is a volume that is delimited vertically by the upper and lower skin portions 18C,18D, and is delimited in the chordwise direction by the forward spar 14A and the leading edge portion 18A of the skin 18.

Figure 2A:
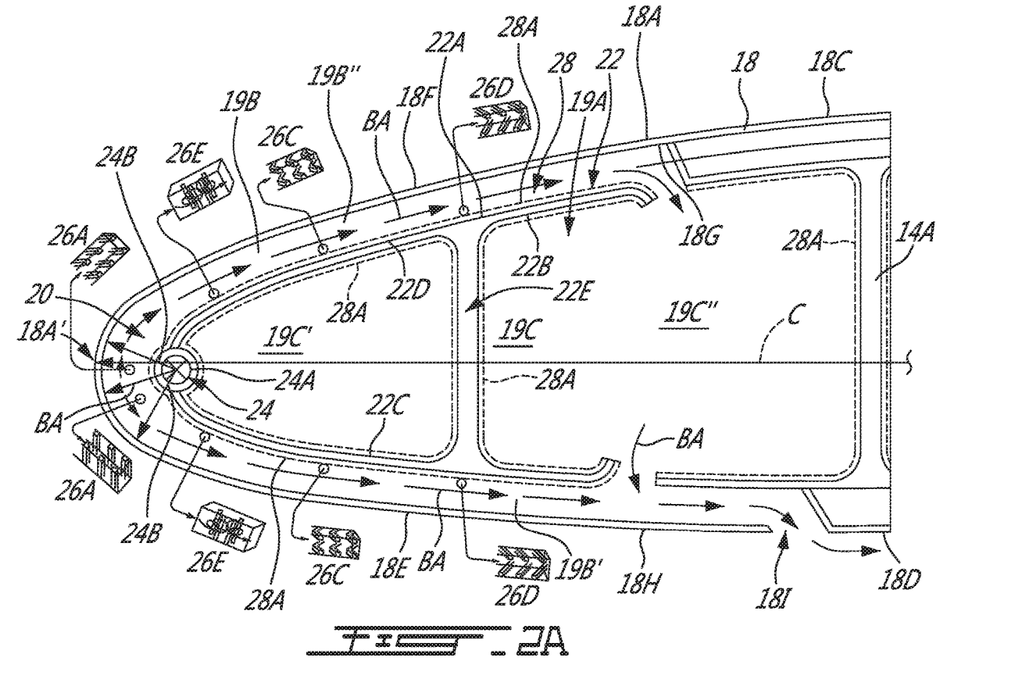
FIG. 2A is a cross-sectional view of a leading edge portion of the wing of the aircraft of FIG. 1A, taken along the line IIA-IIA in FIG. 1B.

FIG. 2A shows the leading edge portion 18A of the skin 18 in a cross-sectional plane taken transverse to the span S of the wing body 11. The leading edge portion 18A includes pressure side section 18E and a suction side section 18F. The pressure side section 18E in FIG. 2A is part of the lower skin portion 18D, and the suction side section 18F is part of the upper skin portion 18C. The pressure and suction side sections 18E, 18F converge and meet to define the leading edge 18A' of the wing 10. The leading edge portion 18A has a curved cross-sectional shape. In FIG. 2A, the leading edge portion 18A has a cross-sectional shape in the form of a "C". The leading edge portion 18A defines an inner surface 18G and an outer surface 18H. The outer surface 18H is exposed to the elements, and to the flow of air along the wing 10. The inner surface 18G is shielded from the elements. The inner surface 18G defines and delimits a cavity 19A of the wing body 10 along its leading edge 18A'. The cavity 19A shown in FIG. 2A is part of the dry segment 16A of the hollow interior 19 along the leading edge portion 18A of the wing body 11 described above.

Ice may accumulate on and along the wing body 11. For some wings 10, the accumulation of ice may be most problematic along the outer surface 18H of the leading edge portion 18A of the wing body 11. The wing 10 therefore has a wing ice protection system 20. The wing ice protection system 20 is used to remove ice that has already accumulated on the wing 10 (sometimes referred to as "de-icing"), and/or to prevent the formation and accumulation of ice on the wing 10 (sometimes referred to as "anti-icing"). The wing ice protection system 20 is described herein as being used along the leading edge portion 18A of the wing 10. It will be appreciated that the wing ice protection system 20 may also be used to provide ice protection for other parts of the wing 10, including but not limited to, the trailing edge portion 18B and the upper and lower skin portions 18C,18D, by making suitable adaptations to the features of the wing ice protection system 20 described herein. The wing ice protection system 20 is shown in FIG. 2A along a specific spanwise position of the wing body 11. It will be appreciated that the wing ice protection system 20 may extend along all or some of the span S of the wing body 11, or be effective along some or all of the span S of the wing body 11.

Still referring to FIG. 2A, the wing ice protection system 20 has a curved flow guide 22 positioned within the cavity 19A. The flow guide 22 is structurally supported from any suitable portion of the wing body 11 (e.g. a rib 14C, the forward spar 14A, the upper or lower skin portions 18C, 18D, etc.) such that the flow guide 22 is suspended within the cavity 19A and stationary with respect to the wing body 11. The flow guide 22 has a chordwise extent measured along the chord C which may vary depending on the desired ice protection function of the wing ice protection system 20 for the wing 10 in question. The flow guide 22 in the depicted embodiment also has a spanwise extent. The spanwise extent of the flow guide 22 may be interrupted or uninterrupted.

The flow guide 22 is spaced apart from the leading edge portion 18A to define a fluid channel 19B along which air bled from the engines 6 can flow. The fluid channel 19B is a portion of the cavity 19A along the leading edge portion 18A. The flow guide 22 is spaced from the inner surface 18G of the leading edge portion 18. The fluid channel 19B is thus delimited in a chordwise direction between the inner surface 18G and the flow guide 22. The fluid channel 19B extends in a chordwise direction aft from the leading edge 18A' adjacent to the pressure and suction side sections 18E,18F of the leading edge portion 18A. In the depicted embodiment, the fluid channel 19B has a "C" shape in the cross-section shown because the flow guide 22 and the leading edge portion 18A also have a cross-sectional "C" shape. Other shapes for the flow guide 22, and thus other shapes for the fluid channel 19B, are possible. The fluid channel 19B in FIG. 2A has a pressure side segment 19B' and suction side segment 19B" which meet and converge adjacent to the leading edge 18A' of the wing body 11. The fluid channel 19B in the depicted embodiment also has a spanwise extent. The spanwise extent of the fluid channel 19B may be interrupted or uninterrupted by components or by design, within the wing body 11.

The curved flow guide 22 further partitions the cavity 19A along the leading edge portion 18A. The flow guide 22 delimits a leading edge interior 19C, and separates the leading edge interior 19C from the fluid channel 19B. An outer surface 22A of the flow guide 22 delimits the fluid channel 19B and an inner surface 22B of the flow guide 22 delimits the leading edge interior 19C. The leading edge interior 19C is positioned inwardly of the curved flow guide 22. In FIG. 2A, the curved flow guide 22 is solid, and uninterrupted with apertures, along its chordwise and/or spanwise extent. The flow guide 22 thus prevents, or substantially reduces, fluid communication between the fluid channel 19B and the leading edge interior 19C along most or all of the chordwise and/or spanwise extent of the flow guide 22. The leading edge interior 19C is thus substantially fluidly isolated from the fluid channel 19B, such that bleed air BA introduced into the fluid channel 19B is prevented from entering the leading edge interior 19C by the flow guide 22. The flow guide 22 in FIG. 2A is a curved plate. The flow guide 22 may be any other object or structure capable of defining the fluid channel 19B and partitioning the cavity 19A along the leading edge portion 18A of the wing 10. The flow guide 22 may be made of any suitable material, including but not limited to, composite material and metal.

Still referring to FIG. 2A, the wing ice protection system 20 also has a bleed air supply 24. The bleed air supply 24 is a structure or assembly of components that conveys the warm or hot bleed air BA from the engines 6 of the aircraft 1 into the fluid channel 19B. In the depicted embodiment, the air BA is drawn or bled from a compressor stage of one or more of the engines 6. In the depicted embodiment, the air BA is drawn or bled from a compressor of one or more of the engines 6 that is downstream from a fan of the one or more engines 6. The air BA bled from a compressor stage downstream of the fan has a higher temperature than air bled from the fan itself. The bleed air BA provided by the bleed air supply 24 circulates through the fluid channel 19B and warms the skin 18 of the wing body 11 along the leading edge portion 18A, thereby helping to melt ice or prevent ice formation and accumulation. In FIG. 2A, the bleed air BA circulates in the fluid channel 19B through the pressure and suction side segments 19B',19B" in a chordwise direction toward the trailing edge 18B' of the wing 10. The bleed air BA circulates around the flow guide 22 and eventually exits the cavity 19A and the wing body 11 via a bleed air outlet 18I, which is shown in FIG. 2A as being formed in the pressure side section 18E of the leading edge portion 18A. It will be appreciated that the bleed air BA may also circulate in the fluid channel 19B in a spanwise direction through the wing body 11, in addition to circulating in the chordwise direction towards the trailing edge 18B' of the wing 10. It will thus be appreciated that the wing ice protection system 20 is a pneumatic wing ice protection system 20 that functions to bleed warm air from the engines 6.

It will be appreciated that many different configurations for the bleed air supply 24 which provide such functionality are possible and within the scope of the present disclosure. One possible, non-limiting configuration of the bleed air supply 24 is now described with reference to FIG. 2A. The bleed air supply 24 includes a pipe 24A having a spanwise extent and disposed in the cavity 19A. The pipe 24A is in fluid communication with one or more of the engines 6 to receive the bleed air BA therefrom. The pipe 24A in FIG. 2A is spaced in a chordwise direction from the leading edge 18A' and adjacent thereto. The pipe 24A has one or more pipe orifices 24B through which the bleed air BA is conveyed into the fluid channel 19B. The orifices 24B may be spaced circumferentially apart from each other about a longitudinal axis of the pipe 24A, and may also be spaced apart from each other along the axis of the pipe 24A in a spanwise direction. In the illustrated embodiment, the pipe 24A is mounted to the flow guide 22 at the convergence of pressure and suction side segments 22C,22D of the flow guide 22. This position of the pipe 24A places the orifices 24B adjacent to the inner surface 18G of the skin 18 at the leading edge 18A', allowing the bleed air BA to be conveyed under pressure through the orifices 24B to first impinge on the inner surface 18G at the leading edge 18A', and to then disperse through the fluid channel 19B along the leading edge portion 18A, thus heating up all of the inner surface 18G along the pressure and suction side sections 18E,18F of the leading edge portion 18A of the skin 18. It will be appreciated that the pipe 24A may also be positioned elsewhere in the cavity 19A. The pipe 24A may also be any other conduit or flow-conveying device capable of the functionality ascribed to it herein.

Still referring to FIG. 2A, the wing ice protection system 20 also includes turbulence-generating members 26. The turbulence-generating members 26 (sometimes referred to herein simply as "members 26") are objects, structures, or formations that generate turbulence in the bleed air BA as it travels through the fluid channel 19B and/or increase the Nusselt number (Nu) of the bleed air BA in the fluid channel 19B. The members 26 may be disposed on either one of, or both of, the inner surface 18G of the leading edge portion 18A and the curved flow guide 22, so as to engage the bleed air BA in the fluid channel 19B. Generating turbulence in the fluid channel 19B may increase the effectiveness at which heat is transferred from the bleed air BA to the leading edge portion 18A of the skin 18, and thereby may help to improve the effectiveness of melting ice on the outer surface 18H or preventing its formation and accumulation. The members 26 may therefore cause an increase in heat transfer from the bleed air BA to the leading edge portion 18A of the wing 10. The wing ice protection system 20 thus uses turbulence-generating members 26 within an inner cavity 19A of the wing leading edge 18A' and within the path of the hot bleed air BA impinging upon the inner surface 18G of the skin 18 of leading edge 18A'. This may help reduce the amount of hot bleed air BA required for ice protection purposes, and thereby allow for reducing the air bled off one or more of the engines 6. Reducing the amount of air bled off one or more of the engines 6 may allow the engines 6 to consume less fuel for the same mechanical power.

Different shapes, patterns, arrangements, positions, and configurations of the turbulence-generating members 26 are possible to accomplish this functionality, all of which are within the scope of the present disclosure. Some possible shapes, patterns, arrangements, positions, and/or configurations of the turbulence-generating members 26 are now described in greater detail.

Still referring to FIG. 2A, the members 26 may be positioned at different locations along the leading edge portion 18A. In FIG. 2A, the members 26 are spaced apart in a chordwise direction to engage the bleed air BA in the fluid channel 19B at different chordwise locations or "stations" of the leading edge portion 18A. The members 26 in the illustrated embodiment are also spaced apart in a spanwise direction of the leading edge portion 18A (see FIG. 1B). It will be appreciated that any combination of members 26 at spanwise and chordwise locations are possible. For example, at a first spanwise position, there may be a first number of members 26 being spaced apart in the chordwise direction, and at a second spanwise position different from the first spanwise position, there may be a second number of members 26 different from the first number that are also spaced apart in the chordwise direction. Flow channels may also be designed in between spanwise locations.

The members 26 may also be positioned along the leading edge portion 18A at the locations where ice protection is most desired. For example, and as shown in FIG. 2A, the members 26 are positioned adjacent both of the pressure and suction side sections 18E,18F of the leading edge portion 18A. The heat transfer from the bleed air BA may therefore be enhanced on both the pressure and suction side sections 18E,18F. This may reduce the amount of bleed air BA required for a given ice protection condition, and thus subsequently minimize the air bled from the engines 6 while helping to reduce the fuel burn, so as to help enhance engine performance. In an alternate embodiment, the members 26 are positioned adjacent to only one of the pressure and suction side sections 18E,18F of the leading edge portion 18A.

Figure 2B:
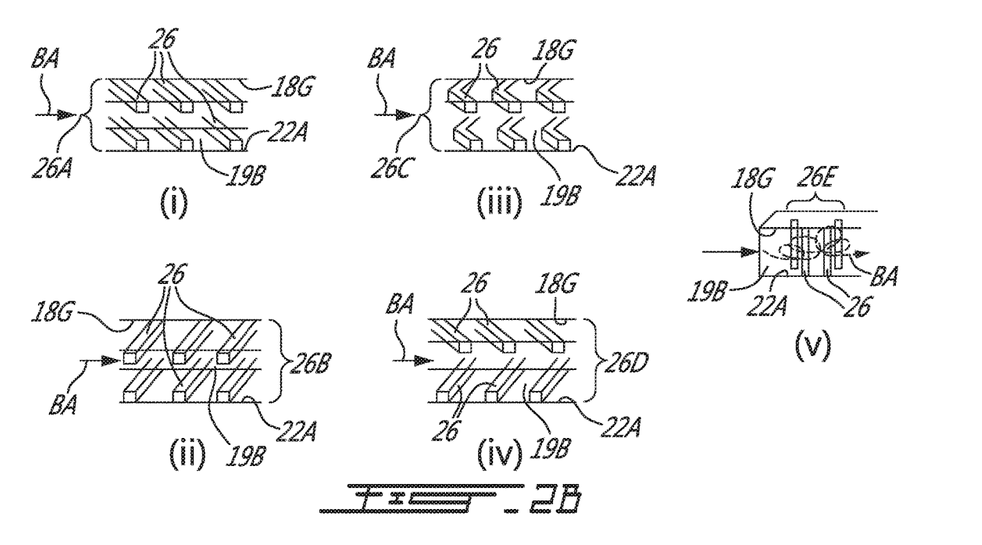
FIG. 2B shows different examples of turbulence-generating members disposed within the leading edge portion of the wing shown in FIG. 2A.

Various shapes and types of members 26 may be used to engage the bleed air BA in the fluid channel 19B, some of which are now described in greater detail with reference to FIG. 2B. Referring to inset (i) of FIG. 2B, a set of first members 26A includes rib protrusions extending outwardly from both the outer surface 22A of the flow guide 22 and the inner surface 18G of the leading edge portion 18A, and into the fluid channel 19B. The rib protrusions are oriented substantially perpendicular to the anticipated flow direction of the bleed air BA. Referring to inset (ii) of FIG. 2B, a set of second members 26B also includes rib protrusions extending outwardly from both the outer surface 22A of the flow guide 22 and the inner surface 18G of the leading edge portion 18A, and into the fluid channel 19B. The rib protrusions are oriented substantially parallel to each other and are inclined (i.e. angled) relative to the anticipated flow direction of the bleed air BA. Referring to inset (iii) of FIG. 2B, a set of third members 26C also includes rib protrusions extending outwardly from both the outer surface 22A of the flow guide 22 and the inner surface 18G of the leading edge portion 18A, and into the fluid channel 19B. The rib protrusions are oriented substantially parallel to each other and are shaped as "Chevrons" and thus have a "V" shape. Referring to inset (iv) of FIG. 2B, a set of fourth members 26D also includes rib protrusions extending outwardly from both the outer surface 22A of the flow guide 22 and the inner surface 18G of the leading edge portion 18A, and into the fluid channel 19B. The rib protrusions are oriented transverse to each other, such that the rib protrusions extending outwardly from the inner surface 18G of the leading edge portion 18A have a different orientation than the rib protrusions extending outwardly from the outer surface 22A of the flow guide 22. Referring to inset (v) of FIG. 2B, a set of fifth members 26E includes posts or pedestals extending through the fluid channel 19B between the outer surface 22A of the flow guide 22 and the inner surface 18G of the leading edge portion 18A. These posts may introduce swirl into the flow of bleed air BA. The sets of members 26A,26B,26C,26D, 26E may be referred to as "enhancers". Each of the sets of members 26A,26B,26C,26D,26E may include one or more turbulence-generating members 26. It will be appreciated that other shapes and types of members 26 are also possible and within the scope of the present disclosure. For example, in an alternate embodiment, a set of members 26 includes recesses extending inwardly into one or both the outer surface 22A of the flow guide 22 and the inner surface 18G of the leading edge portion 18A. In another embodiment, a set of members 26 includes both protrusions and recesses. It will be appreciated that the sets of members 26A,26B,26C, 26D,26E are different from one another, where "different" is understood to mean that each of the sets of members 26A,26B,26C,26D,26E has a unique influence on the flow of bleed air BA in the fluid channel 19B.

FIG. 2A shows one possible example of a pattern or arrangement of the members 26 along the leading edge portion 18A. It will be appreciated, that in the embodiment shown in FIG. 2A, the bleed air BA travels sequentially through the different sets of members 26. Sets of the first members 26A are located at a first chordwise station of the leading edge portion 18A corresponding to the leading edge 18A' of the wing 10. A set of the fifth members 26E are located at a second station of the leading edge portion 18A spaced apart in a chordwise direction from the first station and downstream (along a direction of flow of the bleed air BA) therefrom. The fifth members 26E are positioned adjacent both the pressure and suction side sections 18E,18F of the leading edge portion 18A. A set of the third members 26C are located at a third station of the leading edge portion 18A spaced apart in a chordwise direction from the second station and downstream therefrom. The third members 26C are positioned adjacent both the pressure and suction side sections 18E,18F of the leading edge portion 18A. Finally, a set of the fourth members 26D are located at a fourth and final station of the leading edge portion 18A spaced apart in a chordwise direction from the third station and downstream therefrom. The fourth members 26D are positioned adjacent both the pressure and suction side sections 18E,18F of the leading edge portion 18A. There is thus N×S possible combinations of sets of members 26 and chordwise stations, where N is the number of sets of members 26 and S is the number of chordwise stations. Using a variety of sets of members 26 in the fluid channel 19B may help to control or tailor the temperature along the outer surface 18H of the leading edge portion 18A, in both a chord C direction and a span S direction of the wing 10.

Although the members 26 are described above as being present on both the flow guide 22 and the inner surface 18G of leading edge portion 18A, it will be appreciated that the members 26 may be positioned on only one of the flow guide 22 and the inner surface 18G of the leading edge portion 18A. The members 26 may be formed using any suitable technique. In an embodiment, the members 26 are integral with the flow guide 22 and/or the inner surface 18G of the leading edge portion 18A, and are formed by machining the material from which the flow guide 22 and/or the inner surface 18G of the leading edge portion 18A. In another embodiment where the members 26 are integral, the members 26 are formed using additive manufacturing during the manufacturing of the flow guide 22 and/or the inner surface 18G of the leading edge portion 18A. In another embodiment, the members 26 are formed separately from the flow guide 22 and/or the inner surface 18G of the leading edge portion 18A, and attached thereto using any suitable technique (e.g. mechanical fastener, bonding, etc.).

The wing ice protection system 20 thus includes turbulence-generating members 26 which, in at least one possible embodiment, are different from each other and positioned at different chordwise stations and spanwise locations along the span S of the wing 10.

In an optional embodiment, such as the one shown in FIG. 2A, the wing ice protection system 20 also includes a thermal barrier 28. The thermal barrier 28 is disposed on the flow guide 22 to thermally insulate the leading edge interior 19C from the hot bleed air BA in the fluid channel 19B. When the bleed air BA is flowing through the fluid channel 19B, a first air temperature is defined in the fluid channel 19B, and a second air temperature lower than the first air temperature is defined in the leading edge interior 19C because of the thermal barrier 28. By preventing or reducing heat transfer from the fluid channel 19B toward the interior of the leading edge portion 18A, the thermal barrier 28 helps to ensure that the heat energy in the bleed air BA is conveyed primarily or only in the fluid channel 19B where it is most effective for performing ice protection for the leading edge portion 18A. The thermal barrier 28 thus helps to direct the heat energy in the bleed air BA outwardly toward the outer skin 18 of the wing 10.

Many types and configurations of the thermal barrier 28 are possible to achieve this functionality, and all are included in the present disclosure. In the depicted embodiment, the thermal barrier 28 includes a coating 28A applied to the surfaces of the flow guide 22. Many possible thermal barrier coatings 28A (TBC) may be used, including Alumina based, thermally sprayed ceramics and substrates comprised of NiCoCrAl, for example. In an another embodiment, the thermal barrier 28 is formed from an insulating material making up the flow guide 22. In FIG. 2A, the thermal barrier 28 is shown disposed on both the outer surface 22A and the inner surface 22B of the flow guide 22. The thermal barrier 28 is disposed on both pressure and suction side segments 22C,22D of the flow guide 22. The thermal barrier 28 is also disposed on part of the forward spar 14A. The thermal barrier 28 is also disposed on a diaphragm 22E of the flow guide 22 extending between the pressure and suction side segments 22C,22D to partition the leading edge interior 19C into a forward portion 19C' and an aft portion 190". The forward portion 19C' is sealed from the fluid channel 19B such that the bleed air BA is prevented from entering the forward portion 19C'. The bleed air BA is free to travel through the aft portion 190" to eventually exit the cavity 19A via the bleed air outlet 18I. The diaphragm 22E is upright, and may extend in a spanwise direction. In another embodiment, the thermal barrier 28 is disposed on only the outer surface 22A of the flow guide 22.

When the sets of members 26 are positioned in at least some of the N×S possible combinations, it may be possible to affect the Nusselt number of the bleed air BA in the fluid channel 19B. The Nusselt number (Nu) is a dimensionless heat transfer/flow parameter which is a product of the Reynolds number (Re) and the Pandtl number (Pr), modified by an empirical factor C which is dictated by the heat enhancement of the specific set of members 26. For a same Re, it may be possible to increase the Nu by orders of magnitude using at least some of the N×S possible combinations of the sets of members 26 when compared to smooth fluid channel without the members 26. Thus at least some of the N×S possible combinations of the sets of members 26 may allow a similar or better level of heat transfer in the fluid channel 19B with a lower amount of bleed air BA. Using this approach may allow reducing the bleed air BA drawn from one or more of the engines 6 for ice protection operations. This may in turn reduce engine fuel consumption and make available more engine power for crucial parts of the flight mission such as take off and climb when icing may be prevalent. Using this approach may allow reducing the temperature of the air bled off the one or more engines 6, thus allowing the bleed air BA to be drawn from different engine locations, which may be more favorable to engine performance by reducing specific fuel consumption (SFC).

Figure 3:
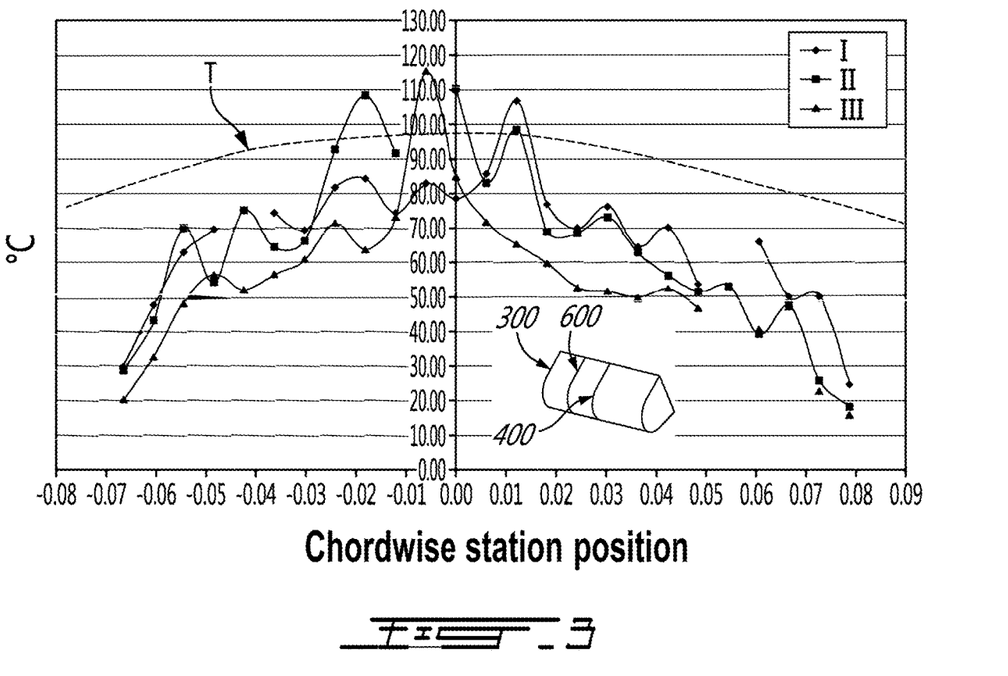
FIG. 3 shows a graph plotting wing surface temperature on the leading edge portion as a function of chordwise stations along the leading edge portion.

When the sets of members 26 are positioned in at least some of the N×S possible combinations, it may be possible to provide a more uniform temperature distribution along the pressure and suction side sections 18E,18F of the leading edge portion 18A. FIG. 3 shows a graph plotting temperature in degrees Celsius on the leading edge portion 18A of the skin 18 as a function of chordwise stations along the leading edge portion 18A on both the pressure and suction side segments 18E,18F. The zero value on the horizontal axis corresponds to the station at the leading edge 18A', the negative values correspond to the stations along the pressure side segment 18E, and the positive values correspond to the stations along the suction side segment 18F. As can be seen, a possible temperature profile T resulting from the use of at least some of the N×S possible combinations of the sets of members 26 forms a smooth arc with substantially uniform temperature values at corresponding stations on the pressure and suction side sections 18E,18F. FIG. 3 also shows three temperature profiles I, II, III for three different chordwise stations at three different spanwise locations along a leading edge which does not use the members 26. In contrast to the smooth and comparatively uniform possible temperature profile T, the three temperature profiles I, II, III fluctuate significantly in temperature values and are not uniform on corresponding pressure and suction side locations downstream from the leading edge.

Referring to FIG. 2A, there is also disclosed a method of providing ice protection for the wing 10. The method includes conveying bleed air BA to the leading edge portion 18A to flow along the inner surface 18G of the leading edge portion 18A. This includes conveying the bleed air BA through turbulence-generating members 26 being spaced apart within the leading edge portion 18A in a chordwise direction, and/or being spaced apart within the leading edge portion 18A in a spanwise direction.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft wing, comprising:
   a wing body having a wing root spaced apart from a wing tip to define a span of the wing, and a leading edge spaced apart from a trailing edge to define a chord of the wing, a skin of the wing body having a leading edge portion with an inner surface delimiting a cavity of the wing body;
   a wing ice protection system, comprising:
      a curved flow guide disposed within the cavity and spaced apart from the leading edge portion to define a fluid channel therebetween, the curved flow guide delimiting a leading edge interior separated from the fluid channel;
      a bleed air supply operable to convey bleed air to the fluid channel; and
      a plurality of turbulence-generating members disposed on the curved flow guide and/or on the inner surface of the leading edge portion to engage the bleed air in the fluid channel, the plurality of turbulence-generating members being spaced apart in a chordwise direction and/or in a spanwise direction along the curved flow guide and/or along the inner surface, the plurality of turbulence-generating members including a set of first turbulence-generating members and at least a set of second turbulence-generating members, the first set of turbulence-generating members being different from the second set of turbulence-generating members, the first set of turbulence-generating members being spaced apart at least in the chordwise direction from the second set of turbulence-generating members.

2. The aircraft wing of claim 1, wherein the turbulence-generating members include a protrusion extending from the curved flow guide and/or the inner surface into the fluid channel.

3. The aircraft wing of claim 1, wherein the turbulence-generating members include a recess extending into the curved flow guide and/or the inner surface.

4. The aircraft wing of claim 1, wherein the turbulence-generating members are disposed on only one of the curved flow guide and the inner surface of the leading edge portion.

5. The aircraft wing of claim 1, wherein the turbulence-generating members are disposed on both of the curved flow guide and the inner surface of the leading edge portion.

6. The aircraft wing of claim 1, wherein the leading edge portion of the skin includes a pressure side section and a suction side section, the turbulence-generating members being positioned adjacent only one of the pressure and suction side sections of the leading edge portion.

7. The aircraft wing of claim 1, wherein the leading edge portion of the skin includes a pressure side section and a suction side section, the turbulence-generating members being positioned adjacent both of the pressure and suction side sections of the leading edge portion.

8. The aircraft wing of claim 1, wherein the curved flow guide includes an outer surface delimiting the fluid channel and an inner surface delimiting the leading edge interior, the wing ice protection system having a thermal barrier disposed on the outer surface and/or the inner surface to thermally insulate the leading edge interior from the fluid channel.

9. The aircraft wing of claim 8, wherein the thermal barrier is disposed on only the outer surface.

10. The aircraft wing of claim 8, wherein the thermal barrier is a coating.

11. An aircraft wing, comprising:
   a wing body having a wing root spaced apart from a wing tip to define a span of the wing, and a leading edge spaced apart from a trailing edge to define a chord of the wing, a skin of the wing body having a leading edge portion with an inner surface delimiting a cavity of the wing body;
   a wing ice protection system, comprising:
      a curved flow guide disposed within the cavity and spaced apart from the leading edge portion to define a fluid channel therebetween;
      a bleed air supply operable to convey bleed air to the fluid channel; and
      a plurality of turbulence-generating members positioned within the leading edge portion to engage the bleed air in the fluid channel, the turbulence-generating members being spaced apart along the fluid channel in a chordwise direction, and/or the turbulence-generating members being spaced apart along the fluid channel in a spanwise direction, the plurality of turbulence-generating members including a first set of turbulence-generating members and at least a second set of turbulence-generating members, the first set of turbulence-generating members being different from the second set of turbulence-generating members, the first set of turbulence-generating members being spaced apart at least in the chordwise direction from the second set of turbulence-generating members.

12. The aircraft wing of claim 11, wherein the turbulence-generating members include a protrusion extending from the curved flow guide and/or the inner surface into the fluid channel.

13. The aircraft wing of claim 11, wherein the turbulence-generating members include a recess extending into the curved flow guide and/or the inner surface.

14. The aircraft wing of claim 11, wherein the turbulence-generating members are disposed on only one of the curved flow guide and the inner surface of the leading edge portion.

15. The aircraft wing of claim 11, wherein the turbulence-generating members are disposed on both of the curved flow guide and the inner surface of the leading edge portion.

16. The aircraft wing of claim 11, wherein the leading edge portion of the skin includes a pressure side section and a suction side section, the turbulence-generating members being positioned adjacent only one of the pressure and suction side sections of the leading edge portion.

17. The aircraft wing of claim 11, wherein the leading edge portion of the skin includes a pressure side section and a suction side section, the turbulence-generating members being positioned adjacent both of the pressure and suction side sections of the leading edge portion.

18. The aircraft wing of claim 11, wherein the curved flow guide includes an outer surface delimiting the fluid channel and an inner surface delimiting a leading edge interior of the wing body separated from the fluid channel, the aircraft wing further comprising a thermal barrier being disposed on the outer surface and/or the inner surface.

19. The aircraft wing of claim 18, wherein the thermal barrier is disposed on only the outer surface.

20. The aircraft wing of claim 18, wherein the thermal barrier is a coating.

21. A method of providing icing protection to a wing of an aircraft, comprising: conveying bleed air to a leading edge portion of the wing to flow along an inner surface of the leading edge portion, including conveying the bleed air through turbulence-generating members being spaced apart within the leading edge portion in a chordwise direction of the wing, and/or being spaced apart within the leading edge portion in a spanwise direction of the wing, and including conveying the bleed air sequentially in the chordwise direction through a first set of turbulence-generating members and then through at least a second set of turbulence-generating members being different from the first set of turbulence-generating members.

22. The method of claim 21, wherein conveying bleed air includes conveying bleed air along a pressure side section of the leading edge portion and/or along a suction side section of the leading edge portion.

23. The method of claim 21, wherein conveying bleed air includes conveying bleed air only in a fluid channel defined immediately adjacent the inner surface of the leading edge portion of the wing, a remainder of an interior of the leading edge portion being substantially free of bleed air.

24. The method of claim 21, comprising sourcing bleed air from a compressor of a gas turbine engine of the aircraft.

25. The aircraft wing of claim 1, wherein the curved flow guide includes an outer surface delimiting the fluid channel and an inner surface delimiting the leading edge interior, the wing ice protection system having a thermal barrier disposed on the curved flow guide to thermally insulate the leading edge interior from the fluid channel.

26. The method wing of claim 21, wherein conveying bleed air includes conveying bleed air to have a first temperature in a fluid channel defined immediately adjacent the inner surface of the leading edge portion of the wing, and conveying bleed air to have a second temperature lower than the first temperature in a remainder of an interior of the leading edge portion.

* * * * *